United States Patent
Horng

(10) Patent No.: US 8,419,386 B2
(45) Date of Patent: Apr. 16, 2013

(54) DC MOTOR WITH CUP-SHAPED STATOR AND DC FAN FORMED FROM THE DC MOTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 805 days.

(21) Appl. No.: 12/496,715

(22) Filed: Jul. 2, 2009

(65) Prior Publication Data

US 2011/0002796 A1 Jan. 6, 2011

(51) Int. Cl.
*F04B 35/04* (2006.01)
*H02K 9/18* (2006.01)
*H02K 3/04* (2006.01)
*H02K 1/06* (2006.01)

(52) U.S. Cl.
USPC .................. 417/353; 417/423.7; 417/423.14; 310/71; 310/89; 310/208; 310/216.002

(58) Field of Classification Search .................. 417/352, 417/353, 423.7, 423.15, 423.14, 424.1, 424.2; 310/71, 89, 208, 216.002; 361/695, 679.48
See application file for complete search history.

(56) References Cited

U.S. PATENT DOCUMENTS

| 4,760,298 | A | | 7/1988 | Kitahara et al. |
| 4,943,748 | A | | 7/1990 | Shiozawa |
| 5,223,759 | A | | 6/1993 | Shimoda et al. |
| 5,497,040 | A | | 3/1996 | Sato |
| 5,710,474 | A | * | 1/1998 | Mulgrave ............... 310/216.002 |
| 5,723,933 | A | * | 3/1998 | Grundl et al. ................. 310/266 |
| 2008/0292469 | A1 | * | 11/2008 | Taniguchi et al. .............. 417/14 |

* cited by examiner

*Primary Examiner* — Devon Kramer
*Assistant Examiner* — Bryan Lettman
(74) *Attorney, Agent, or Firm* — Alan Kamrath; Kamrath IP Lawfirm, P.A

(57) ABSTRACT

A DC motor includes a rotor, a cup-shaped stator, and a drive control unit. The cup-shaped stator includes a cylindrical winding portion surrounding the rotor. The cylindrical winding portion includes an inner periphery formed by at least one conductive wire and facing an outer periphery of a permanent magnet of the rotor with an air gap formed between the cylindrical winding portion and the rotor. A drive control unit is electrically connected to the cylindrical winding portion and a power source. The DC motor can be mounted in a compartment of a housing, and an impeller can be coupled to the shaft, forming a DC fan. The DC motor and the DC fan possess high control sensitivity and high control precision while having simplified structures to allow easy assembly.

9 Claims, 4 Drawing Sheets

DC MOTOR WITH CUP-SHAPED STATOR AND DC FAN FORMED FROM THE DC MOTOR

BACKGROUND OF THE INVENTION

1. Field of the Invention

The present invention relates to a DC motor and, more particularly, to an inner rotor type DC motor with a cup-shaped stator. The present invention also relates to a DC fan formed from the DC motor.

2. Description of the Related Art

FIG. 1 shows a conventional DC fan including a housing 7, a DC motor 8, and an impeller 9. The housing 7 has a compartment 71 for receiving the DC motor 8. The DC motor 8 includes a stator 81 fixed to an inner periphery of the housing 7. The DC motor 8 further includes a rotor 82 rotatably received in the compartment 71. The stator 81 of the DC motor 8 includes an annular permanent magnet 811 surrounding the rotor 82. The stator 81 further includes a brush 812 adjacent an end of the permanent magnet 811 and electrically connected to a DC power source. The rotor 82 of the DC motor 8 includes a shaft 821, a winding core 822, and a converter 823. An end of the shaft 821 extends beyond the housing 7 and is coupled to the impeller 9. The winding core 822 is mounted around the shaft 821 and includes an outer periphery facing the permanent magnet 811 with an air gap formed between the winding core 822 and the permanent magnet 811. Electricity passing through the coil of the winding core 822 interacts with a magnetic field created by the permanent magnet 811. The converter 823 is also mounted around the shaft 821 and electrically connected to the coil of the winding core 822. The converter 823 has an outer periphery for sliding, electrical contact with the brush 812.

In operation, when DC power is supplied from the DC power source to the brush 812 of the stator 81, the DC power is transmitted through the converter 823 of the rotor 82 to the coil of the winding core 822. Electric current generated in the coil by the DC power interacts with the magnetic field created by the permanent magnet 811, driving the rotor 82 to rotate relative to the stator 81. The speed of the rotor 82 can be decided by controlling the DC power to modulate the current in the coil of the winding core 822.

However, the converter 823 is parallel to the shaft 821 and includes a plurality of spaced converter plates, such that sparks are liable to occur between the brush 812 and the converter 823 when the brush 812 moves from one of the converter plates to an adjacent converter plate. At the same time, a noise signal adversely affecting system self-control is apt to be generated. Further, the brush 812 must be in tight contact with the outer periphery of the converter 823 to assure electrical connection therebetween. To avoid adverse affect to the electrical connection between the brush 812 and the converter 823 by accumulated carbon resulting from sparks, the worn-out brush 812 must be periodically replaced, and the outer periphery of the converter 823 must be periodically cleaned. Further, although the speed of the rotor 82 can be decided by controlling the DC power, noise signals are apt to be generated during DC power transmission between the brush 812 and the converter 823, for the brush 812 moves between the converter plates. As a result, the DC fan can not be utilized in products requiring precise control of the speed of the fan.

FIG. 2 shows another conventional DC fan. The DC motor 8 of the DC fan of FIG. 1 is replaced by a DC motor 8' having a cup-shaped rotor 82' in the DC fan of FIG. 2. The cup-shaped rotor 82' includes a cup-shaped coil 822' and a shaft 821' extending through the cup-shaped coil 822' along an axis of the cup-shaped coil 822'. The cup-shaped coil 822' is formed by winding at least one conductive wire. An annular permanent magnet 811' of a stator 81' of the DC motor 8' is mounted in the cup-shaped coil 822' with a shaft 821' extending through the permanent magnet 811'. An inner periphery of the cup-shaped coil 822' faces the permanent magnet 811' with an air gap formed between the cup-shape coil 822' and the permanent magnet 811'. The cup-shaped rotor 82' possesses characteristics including low rotating inertia and high energy conversion rate such that the sensitivity in speed control of the DC fan can be enhanced. However, the light-weight structure reduces the rotational stability, while the DC motor 8' still requires a brush 812' and a converter 823' to proceed with transmission of DC power. Namely, the disadvantages of the brush 812 and the converter 823 of the DC fan of FIG. 1 still exist.

Further, when the load of the above-mentioned DC motors 8, 8' is changed, an additional sensing device such as a mechanical governor, an electronic governor, a speed signal generator, or an optical encoder is required to feed back the actual speed of the DC motors 8, 8', so that the voltage of the DC power can be adjusted to drive the DC motors 8, 8' to rotate at an expected speed. However, the manufacturing costs of the DC motors 8, 8' and the DC fan formed from the DC motors 8, 8' are increased, while the accuracy of the sensing device affects the controlling quality of the speed.

Thus, a need exists for a DC motor allowing precise speed control while allowing easy assembly and manufacture at low costs.

SUMMARY OF THE INVENTION

The primary objective of the present invention is to provide a DC motor with a cup-shaped stator and a DC fan formed from the DC motor. A drive control unit generates control current directly outputted to the cup-shaped stator to provide the DC motor and the DC fan with high control sensitivity and high control precision, allowing intelligent speed control.

Another objective of the present invention is to provide a DC motor with a cup-shaped stator and a DC fan formed from the DC motor. The cup-shaped stator includes a cylindrical winding portion formed by winding at least one conductive wire. The at least one conductive wire is directly formed on an inner periphery of the cylindrical winding portion to reduce the structural complexities of the DC motor and the DC fan.

A further objective of the present invention is to provide a DC motor with a cup-shaped stator and a DC fan formed from the DC motor. The cylindrical winding portion is directly fixed in a compartment of a housing by injection molding to enhance assembling convenience.

In a first aspect according to the preferred teachings of the present invention, a DC fan includes a housing having a frame defining a compartment. A DC motor is mounted in the compartment of the frame and includes a rotor and a cup-shaped stator. The rotor includes a shaft having an outer periphery and a permanent magnet fixed to and around the outer periphery of the shaft. The cup-shaped stator includes a cylindrical winding portion surrounding the rotor. The cylindrical winding portion includes an inner periphery facing an outer periphery of the permanent magnet of the rotor with an air gap formed between the cylindrical winding portion and the rotor. A drive control unit is mounted in the compartment and electrically connected to the cylindrical winding portion of the cup-shaped stator. An impeller is coupled to an end of the shaft. The cylindrical winding portion is formed by winding at least one conductive wire, and the at least one conductive wire is wound to form the inner periphery of the cylindrical winding portion.

Preferably, the frame is formed by injection molding to enclose and engage with the stator, further reducing assembling complexity.

In a second aspect according to the preferred teachings of the present invention, a DC rotor includes a rotor including a shaft having an outer periphery and a permanent magnet fixed to and around the outer periphery of the shaft. A cup-shaped stator includes a cylindrical winding portion surrounding the rotor. The cylindrical winding portion includes an inner periphery facing an outer periphery of the permanent magnet of the rotor with an air gap formed between the cylindrical winding portion and the rotor. A drive control unit is mounted in the compartment and electrically connected to the cylindrical winding portion of the cup-shaped stator. The cylindrical winding portion is formed by winding at least one conductive wire, and the at least one conductive wire is wound to form the inner periphery of the cylindrical winding portion.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
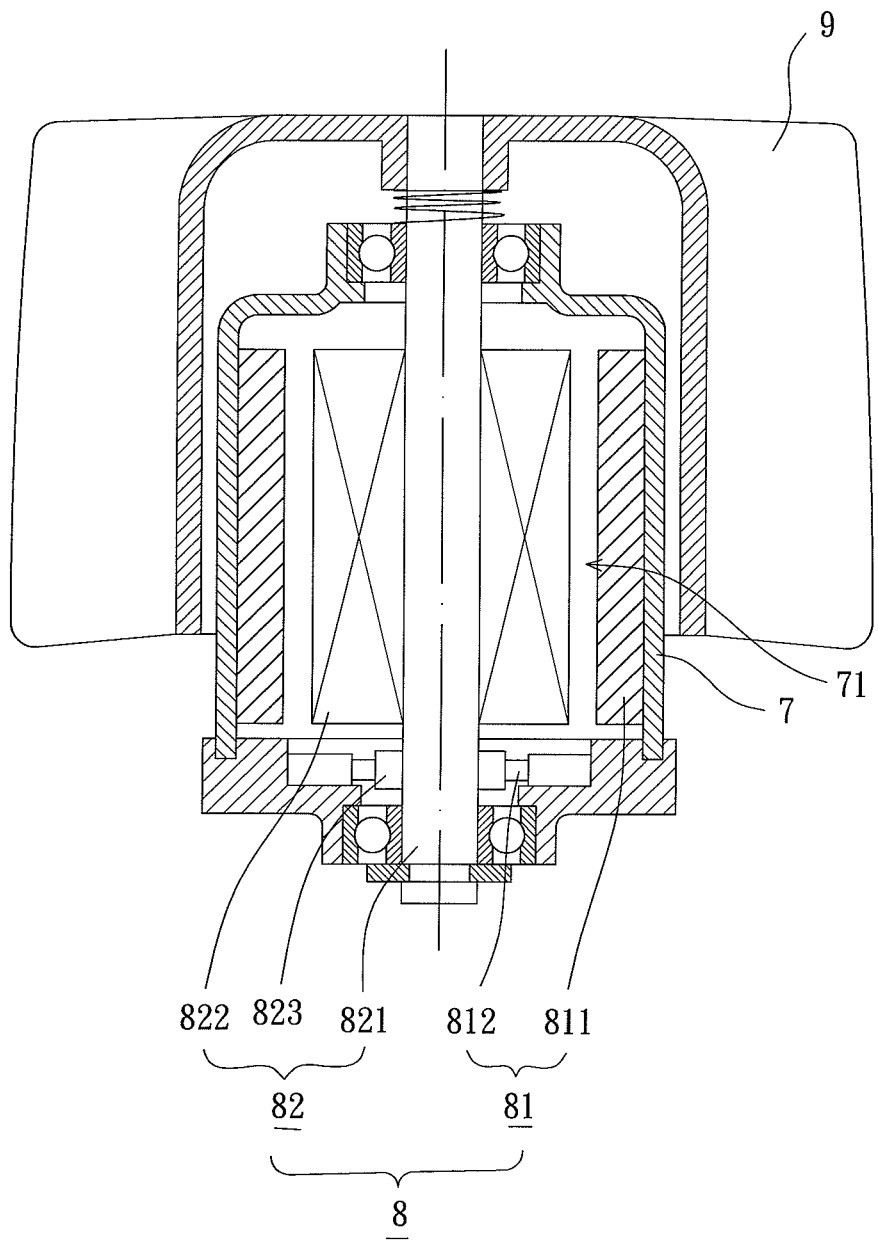
FIG. 1 shows a cross sectional view of a conventional DC fan.
Figure 2:
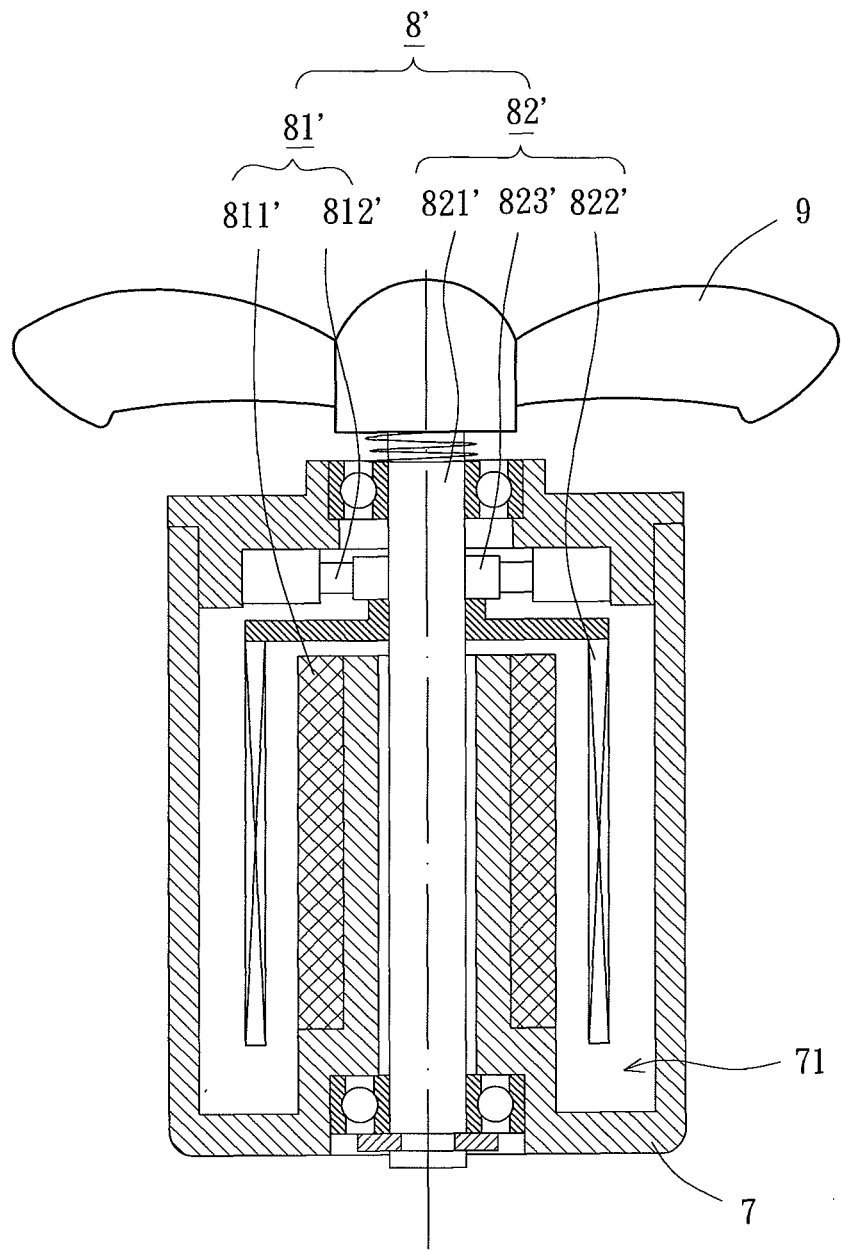
FIG. 2 shows a cross sectional view of another conventional DC fan.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "inner", "outer", "end", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
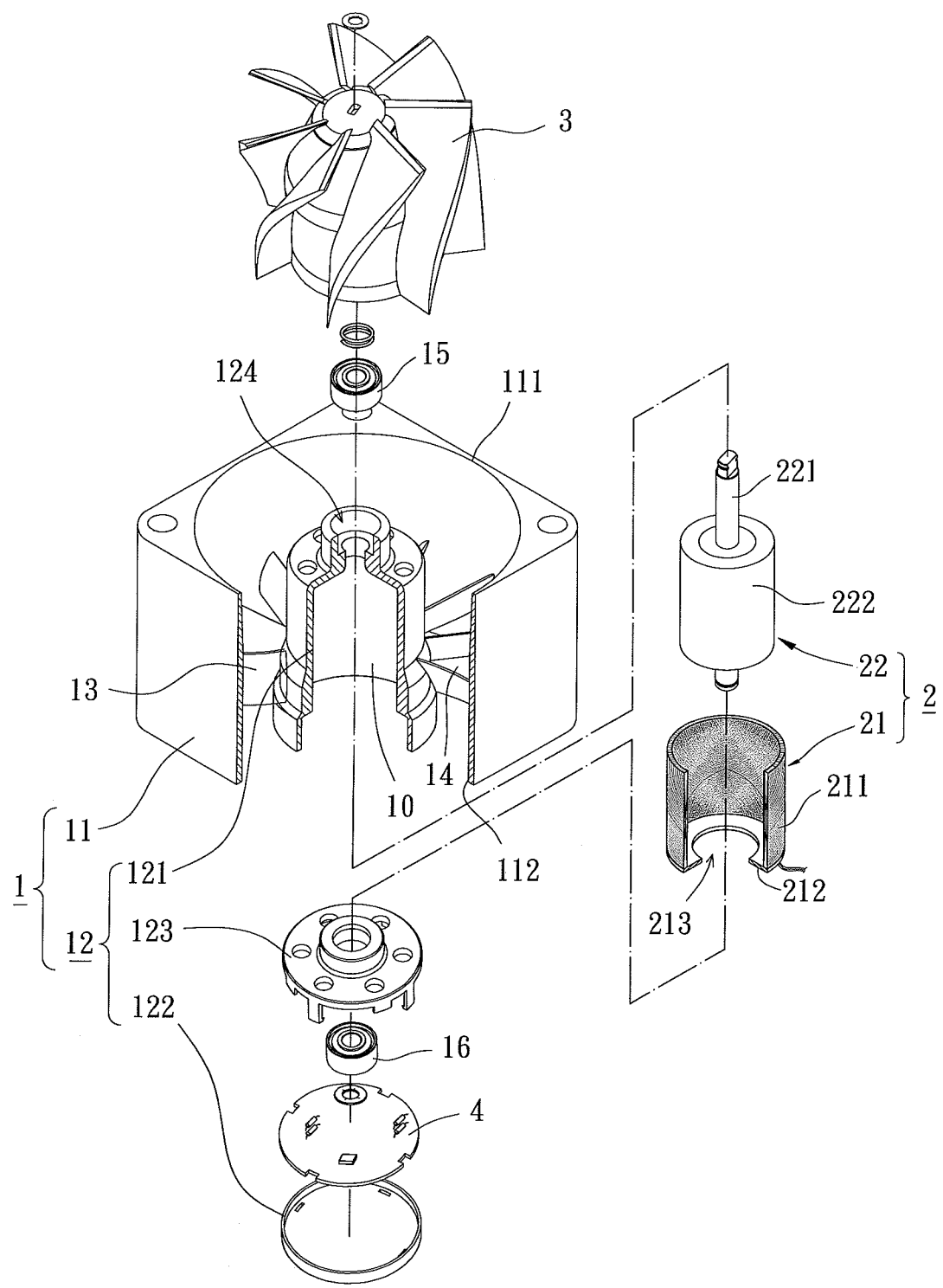
FIG. 3 shows an exploded, perspective view of a DC fan with a cup-shaped rotor according to the preferred teachings of the present invention.
Figure 4:
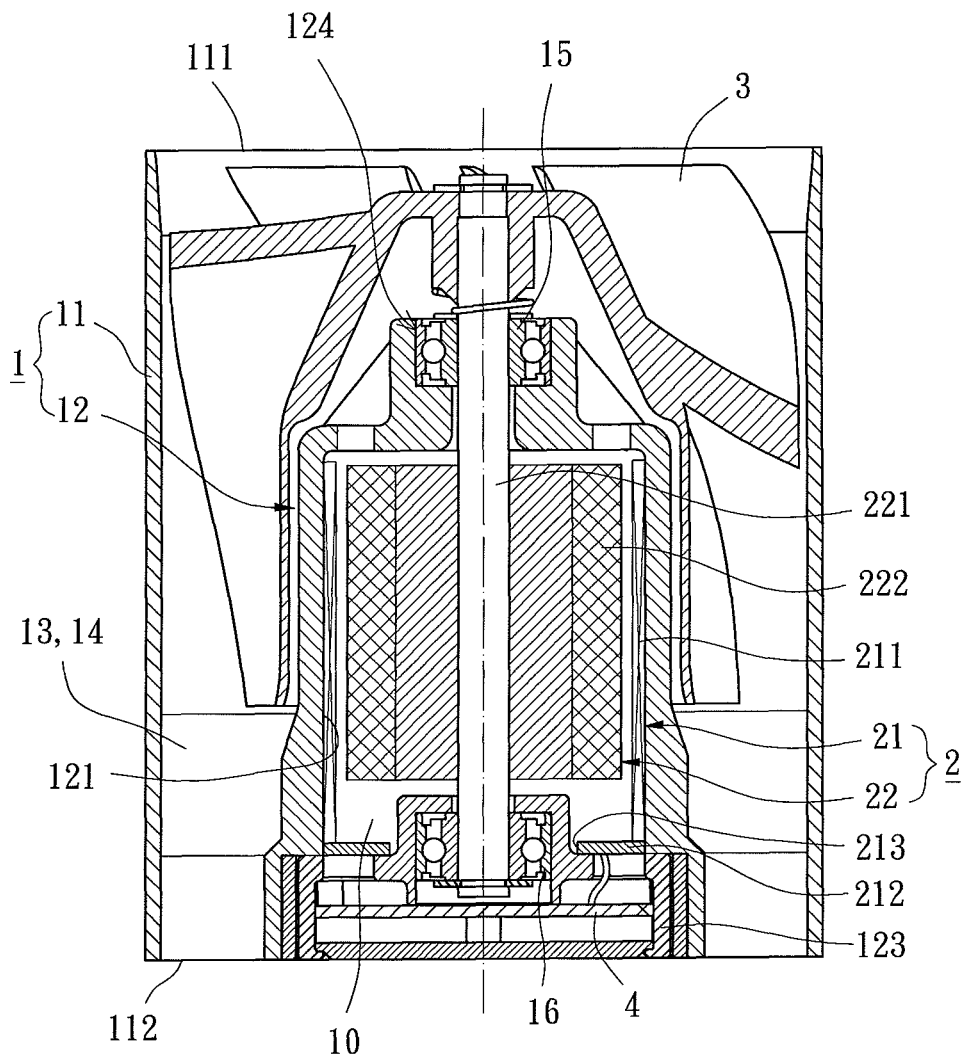
FIG. 4 shows a cross sectional view of the DC fan with the cup-shaped rotor of FIG. 3.

A DC fan according to the preferred teachings of the present invention is shown in FIGS. 3 and 4 of the drawings and generally includes a housing 1, a DC motor 2, an impeller 3, and a drive control unit 4. The housing 1 includes an outer casing 11 and a frame 12. The outer casing 11 includes an air inlet 111 and an air outlet 112 spaced from the air inlet 111 along an axis of the DC motor 2. The frame 12 is mounted inside the outer casing 11 between the air inlet 111 and the air outlet 112. The frame 12 is interconnected by one or more connecting members 13 to the outer casing 11, defining a passageway 14 between the frame 12 and the outer casing 11. Preferably, the outer casing 11, the frame 12, and the connecting members 13 are integrally formed as a single continuous monolithic member. Preferably, the connecting members 13 are adjacent the air outlet 112 of the outer casing 11 and in the form of ribs or stationary vanes.

In the preferred form shown, the frame 12 includes a body 121, a bottom plate 122, and a positioning member 123. The body 121 and the bottom plate 122 are coupled to each other and define a compartment 10. The positioning member 123 is fixed in the compartment 10. The frame 12 further includes an opening 124 formed in a top of the body 121 and facing the air inlet 111. A first bearing 15 is mounted in the opening 124. A second bearing 16 is coupled to the positioning member 123. The first and second bearings 15 and 16 are aligned with each other and spaced along the axis. It can be appreciated that the housing 1 of the DC fan according to the teachings of the present invention can include only the frame 12 having the compartment 10.

In the preferred form shown, the DC motor 2 includes a cup-shaped stator 21 and a rotor 22. The cup-shaped stator 21 surrounds the rotor 22 and fixed between the first and second bearings 15 and 16. Specifically, the cup-shaped stator 21 is adjacent the positioning member 123 and includes a cylindrical winding portion 211, a coupling board 212, and a through-hole 213. The cylindrical winding portion 211 is formed by winding at least one conductive wire. The cylindrical winding portion 211 surrounds the rotor 22 and has an inner periphery facing the rotor 22 with an air gap formed between the cylindrical winding portion 211 and the rotor 22. The coupling board 212 is fixed to an axial end edge of the cylindrical winding portion 211 so that the coupling board 212 and the cylindrical winding portion 211 together form the cup-shaped stator 21. Preferably, the coupling board 212 is adjacent the positioning member 123 of the frame 12. The through-hole 213 is in a center of the coupling board 212, and the rotor 22 extends through the coupling board 212 via the through-hole 213. An inner periphery of the cylindrical winding portion 211 is formed by winding the at least one conductive wire. Alternatively, the coupling board 212 can be omitted, so that the cylindrical winding portion 211 forms the cup-shaped stator 21. Furthermore, in a case that the frame 12 of the housing 1 is formed by injection molding, the frame 12 can enclose and engage with the cup-shaped stator 21 so that the outer periphery of the cup-shaped stator 21 directly engages with the inner periphery of the frame 12. Thus, the complexity in assembly of the DC motor 2 and the DC fan formed from the DC motor 2 according to the preferred teachings of the present invention can be significantly reduced.

In the preferred form shown, the rotor 22 of the DC motor 2 includes a shaft 221 and a permanent magnet 222. An end of the shaft 221 extends through the first bearing 15 and beyond the frame 12 to couple with the impeller 3. The other end of the shaft 221 is coupled with the second bearing 16. The permanent magnet 222 is fixed to and around an outer periphery of the shaft 221. The permanent magnet 222 has an outer periphery facing and spaced from the inner periphery of the cylindrical winding portion 211. Thus, an air gap is formed between the cylindrical winding portion 211 and the rotor 22.

The drive control unit 4 is fixed between the bottom plate 122 and the positioning member 123 along the axis. The drive control unit 4 is electrically connected to the conductive wire of the cylindrical winding portion 211. Furthermore, the drive control unit 4 is electrically connected to an external DC power source.

In operation of the DC fan according to the preferred teachings of the present invention, when the drive control unit 4 receives power generated by the DC power source and generates control current outputted to the conductive wire of the cylindrical winding portion 211 of the cup-shaped stator 21. The control current passes through the conductive wire of the cylindrical winding portion 211 and interacts with a magnetic field created by the permanent magnet 222 of the rotor 22 to drive the impeller 3 to rotate. Since no brushes and no converters are required in the DC fan according to the preferred teachings of the present invention, the control current can be directly transmitted from the drive control unit 4 to the cup-shaped stator 21 of the DC motor 2, significantly reducing interference and noise signals during transmission of the control current. Thus, the circuitry of the drive control unit 4 can be formed by intelligent integrated circuits. Furthermore, high-precision control current can be outputted to the cylindrical winding portion 211 for speed control for achieving high control sensitivity and high control precision without the risk of excessive interference or noise signals.

More specifically, by arranging a current switching circuit in the drive control unit 4, a feedback signal can be generated based on the operation of the current switching circuit to proceed with precise servocontrol of the speed of the DC motor 2 and the DC fan formed from the DC motor 2 according to the preferred teachings of the present invention. Furthermore, pulse width modulation can be utilized in the drive control unit 4 to adjust the average power applied to the DC motor 2 by changing the pulse width at the period of time of conduction. Further, the control current of the drive control unit 4 can be detected and fed back directly to generate and send an alarm signal when abnormal operation occurs. These arrangements apply to cases where the DC fan according to the preferred teachings of the present invention is integrated into other devices.

According to the above, compared to conventional DC fans requiring brushes and converters to transmit DC power that lead to excessive noise signals in the DC power, the DC motor 2 according to the preferred teachings of the present invention can directly transmit the control current from the drive control unit 4 to the cup-shaped stator 21 with high precision to avoid excessive noise signals in the control current, allowing intelligent control of the speed through the drive control unit 4. Furthermore, the hollow cup-shaped stator 21 including the cylindrical winding portion 211 can significantly reduce the structural complexities of the DC fan and the DC motor 2 according to the preferred teachings of the present invention. Further, the cylindrical winding portion 211 can be directly fixed in the compartment 10 of the housing 1 by injection molding, effectively enhancing the assembling convenience of the DC fan according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A DC fan comprising:
    a housing including a frame and a positioning member, with the frame defining a compartment, with the positioning member mounted in the compartment and dividing the compartment into a first chamber and a second chamber;
    a DC motor mounted in the first chamber of the compartment of the frame, with the DC motor including a rotor and a cup-shaped stator, with the rotor including a shaft having an outer periphery and a permanent magnet fixed to and around the outer periphery of the shaft, with the permanent magnet having an outer periphery, with the shaft rotatably mounted to the frame and the positioning member, with the cup-shaped stator including a cylindrical winding portion surrounding the rotor and having an axial end edge, with the cup-shaped stator further including a coupling board fixed to the axial end edge of the cylindrical winding portion and abutting with the positioning member of the frame, with the cylindrical winding portion including an inner periphery facing the outer periphery of the permanent magnet of the rotor with an air gap formed between the cylindrical winding portion and the rotor;
    a drive control unit mounted in the second chamber of the compartment and electrically connected to the cylindrical winding portion of the cup-shaped stator, with the positioning member located intermediate the drive control unit and the permanent magnet; and
    an impeller coupled to an end of the shaft,
    with the cylindrical winding portion formed by winding at least one conductive wire, with said at least one conductive wire wound to form the inner periphery of the cylindrical winding portion.

2. The DC fan as claimed in claim 1, with the frame formed by injection molding to enclose and engage with the cup-shaped stator.

3. The DC fan as claimed in claim 2, further comprising a bottom plate, with the frame and the bottom plate coupled to each other and defining the compartment, with the positioning member fixed in the compartment and adjacent the cup-shaped stator, and with the drive control unit fixed between the bottom plate and the positioning member along an axis about which the shaft rotates.

4. The DC fan as claimed in claim 1, with the coupling board including a through-hole in a center of the coupling board and aligned with the shaft of the rotor, and with the shaft extending through the through-hole.

5. The DC fan as claimed in claim 1, further comprising a bottom plate, with the frame and the bottom plate coupled to each other and defining the compartment, with the positioning member fixed in the compartment and adjacent the cup-shaped stator, and with the drive control unit fixed between the bottom plate and the positioning member along an axis about which the shaft rotates.

6. A DC motor comprising:
    a housing including a frame and a positioning member, with the frame defining a compartment, with the positioning member mounted in the compartment and dividing the compartment into a first chamber and a second chamber;
    a rotor including a shaft having an outer periphery and a permanent magnet fixed to and around the outer periphery of the shaft, with the permanent magnet having an outer periphery, with the shaft rotatably mounted to the frame and the positioning member;
    a cup-shaped stator including a cylindrical winding portion surrounding the rotor and having an axial end edge, with the cup-shaped stator further including a coupling board fixed to the axial end edge of the cylindrical winding portion, with the cylindrical winding portion including an inner periphery facing the outer periphery of the permanent magnet of the rotor with an air gap formed between the cylindrical winding portion and the rotor, with the rotor and the cup-shaped stator located in the first chamber; and a drive control unit mounted in the second chamber of the compartment and electrically connected to the cylindrical winding portion of the cup-shaped stator, with the positioning member located intermediate the drive control unit and the permanent magnet, with the cylindrical winding portion formed by winding at least one conductive wire, with said at least one conductive wire wound to form the inner periphery of the cylindrical winding portion.

7. The DC motor as claimed in claim 6, with the coupling board including a through-hole in a center of the coupling board and aligned with the shaft of the rotor, and with the shaft extending through the through-hole.

8. The DC motor as claimed in claim 7, further comprising a bottom plate, with the frame and the bottom plate coupled to each other and defining the compartment, with the positioning member fixed in the compartment and adjacent the cup-shaped stator, and with the drive control unit fixed between the bottom plate and the positioning member along an axis about which the shaft rotates.

9. The DC motor as claimed in claim 6, further comprising a bottom plate, with the frame and the bottom plate coupled to each other and defining the compartment, with the positioning member fixed in the compartment and adjacent the cup-shaped stator, and with the drive control unit fixed between the bottom plate and the positioning member along an axis about which the shaft rotates.

\* \* \* \* \*